E. L. FREESE.
APPARATUS FOR FELLING TREES.
APPLICATION FILED JUNE 10, 1908.
Reissued Nov. 16, 1909.
13,040.
2 SHEETS—SHEET 1.
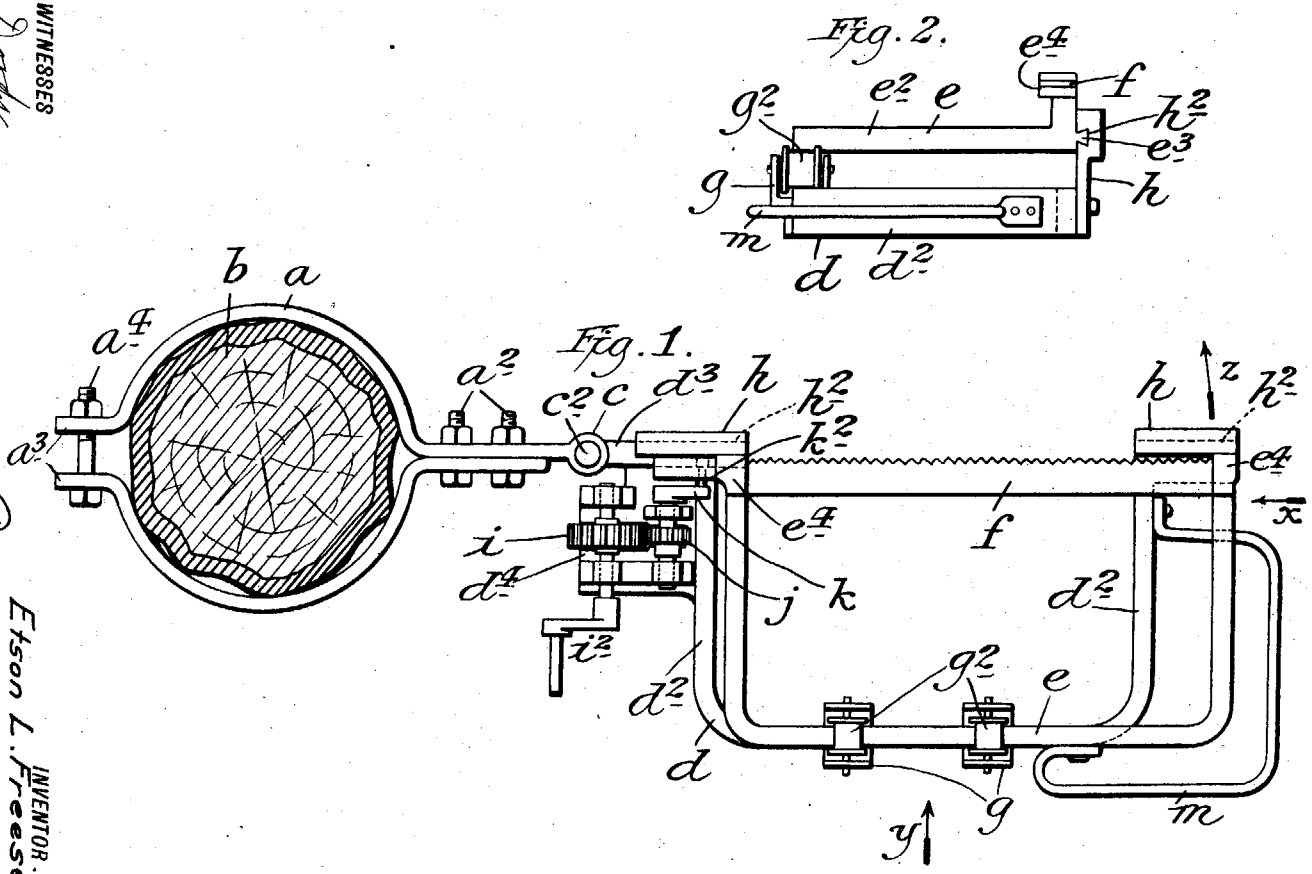
WITNESSES
M. E. Doody.
C. E. Mulheany
INVENTOR.
Etson L. Freese.
BY Edgar Tate & Co.
ATTORNEYS.
ANDREW. B. GRAHAM CO., PHOTO-LITHOGRAPHERS, WASHINGTON, D. C.

E. L. FREESE.
APPARATUS FOR FELLING TREES.
APPLICATION FILED JUNE 10, 1908.
Reissued Nov. 16, 1909.
13,040.
2 SHEETS—SHEET 2.
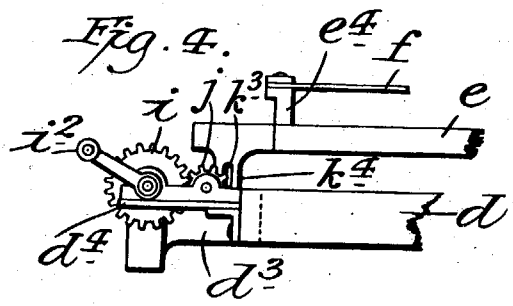
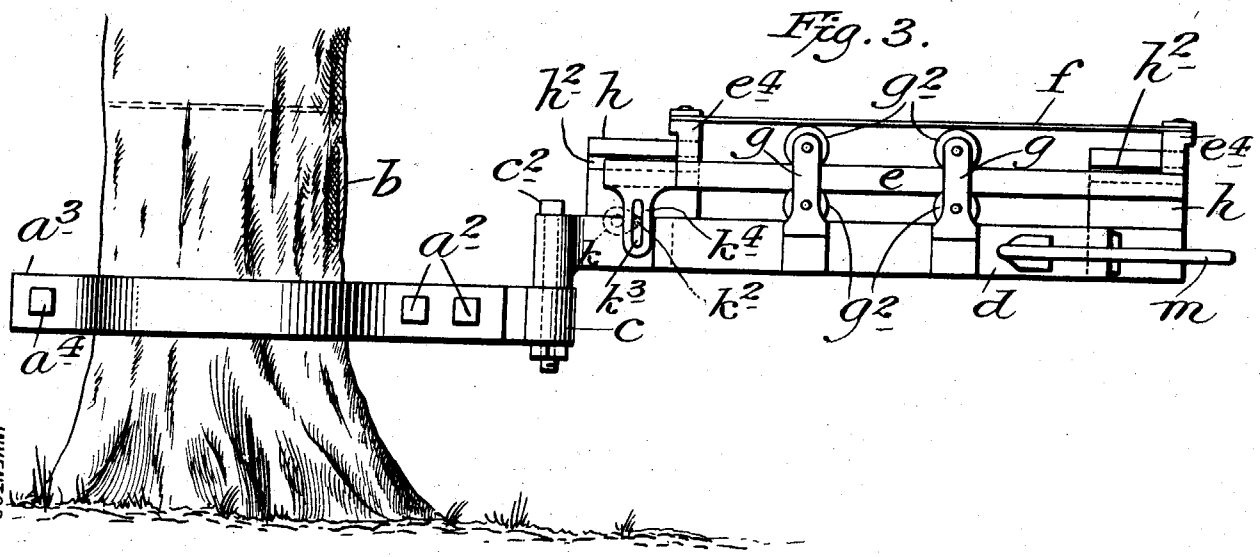
WITNESSES
M. C. Doody.
C. E. Mulreany
INVENTOR.
Etson L. Freese.
BY Edgar Tate & Co.
ATTORNEYS
ANDREW, B. GRAHAM CO., PHOTO-LITHOGRAPHERS WASHINGTON, D. C.

UNITED STATES PATENT OFFICE.

ETSON L. FREESE, OF NEW YORK, N. Y.

APPARATUS FOR FELLING TREES.

13,040. Specification of Reissued Letters Patent. Reissued Nov. 16, 1909.

Original No. 839,466, dated December 25, 1906, Serial No. 331,838. Application for reissue filed June 10, 1908. Serial No. 437,763.

*To all whom it may concern:*

Be it known that I, ETSON L. FREESE, a citizen of the United States, residing in the borough of Manhattan, city of New York, county of New York, and State of New York, have invented certain new and useful Improvements in Apparatus for Felling Trees, of which the following is a specification, such as will enable those skilled in the art to which it appertains to make and use the same.

This invention relates to means or apparatus for felling trees; and the object thereof is to provide an improved device of this class which is particularly designed for felling trees of medium size and which may be connected with the trunk of a tree and operated in such manner as to quickly fell the tree, a further object being to provide an apparatus of the class specified which is simple in construction and operation and comparatively light, whereby the transportation thereof from point to point and the use thereof are facilitated.

The invention is fully disclosed in the following specification, of which the accompanying drawings form a part, in which the separate parts of my improvement are designated by suitable reference characters in each of the views, and in which;—

Figure 1 is a plan view of my improved tree-felling apparatus and showing the same connected with the trunk of a tree, the latter being shown in cross-section; Fig. 2 an end view of the apparatus looking in the direction of the arrow $x$ of Fig. 1; Fig. 3 a back view of the apparatus as shown in Fig. 1 and looking in the direction of the arrow $y$ of Fig. 1, part of the construction of Fig. 1 being omitted in order to show other parts; and Fig. 4 a detail back view showing the parts of the construction which are omitted from Fig. 3.

In the practice of my invention I provide a clamp support $a$, which is adapted to be connected with the trunk of a tree, one of which is indicated at $b$ in Figs. 1 and 3. In the construction shown the clamp support $a$ comprises two semicircular parts connected at one side by a bolt or bolts $a^2$ and provided at the opposite side with projecting jaws $a^3$, through which are passed a bolt or bolts $a^4$. The clamp support $a$ is provided at one side, where the separate parts of said clamp support are connected in the form of construction shown, with a sleeve $c$, through which is passed a coupling pin or bolt $c^2$, on which is mounted a main swinging frame $d$.

The main swinging frame $d$ is U-shaped in form and the sides $d^2$ thereof are parallel, and mounted thereon and movable longitudinally thereon is a supplemental U-shaped frame $e$, the sides $e^2$ of which are parallel and carry a saw $f$.

Secured to the back part of the main swinging frame $d$ are upright bearings or supports $g$, in each of which is mounted a pair of antifriction-rollers $g^2$, and the back part of the supplemental and saw-carrying frame $e$ passes between the separate pairs of antifriction-rollers $g^2$.

The front end of the sides $d^2$ of the main swinging frame $d$ are provided with upright members $h$, having in their rear faces horizontal grooves $h^2$, and the front ends of the sides $e^2$ of the supplemental and saw-carrying frame $e$ are provided with corresponding tongues $e^3$, which are movable in the grooves $h^2$, and the front ends of the side arms $e^2$ of the supplemental and saw-carrying frame $e$ are provided with raised members $e^4$, in which the saw $f$ is secured.

The side arm $d^2$ of the main swinging frame $d$ adjacent to the clamp support $a$ is provided with a right-angle extension $d^3$, by means of which connection with the clamp support $a$ is made, and with a projecting support $d^4$, over which is mounted a gear-wheel $i$, the shaft of which is provided with a crank $i^2$, and the gear-wheel $i$ meshes with a smaller gear wheel or pinion $j$, the shaft of which is provided with a crank $k$, having a pin $k^2$ movable in a vertical slot $k^3$, formed in a hanger $k^4$, which is secured to the adjacent arm $e^2$ of the supplemental saw-carrying frame $e$, and by means of this construction when the shaft of the gear-wheel $i$ is turned by means of the crank $i^2$ the supplemental saw-carrying frame will be rapidly reciprocated in a horizontal plane.

The outer or free end of the main swinging frame $d$ is provided with a handle $m$, which is secured thereto and by means of which the main swinging frame $d$, together with the supplemental saw-carrying frame $e$ and all the operative parts of the apparatus may be swung in a horizontal plane, and in the operation of this apparatus after the clamp *a* is connected with the trunk of a tree the said apparatus or the operative parts thereof involving the frames *d* and *e* and the parts connected therewith is swung around in the direction of the arrow *z* of Fig. 1 until the cutting edge of the saw *f* bears on the trunk of the tree. The gear which operates the saw-carrying frame *e* is then put in motion, and the saw-carrying frame *e* is rapidly reciprocated in a horizontal plane, and during this operation the saw is continually forced against the trunk of the tree by means of the handle *m* of the main swinging frame *d*, and this operation is continued until the trunk of the tree is cut through, or substantially so, after which the apparatus may be detached from the tree and the latter felled by a few strokes of an ax, or wedges may be driven into the cut formed by the saw for this purpose, or, if desired, the tree may be felled without detaching the saw therefrom.

In the construction shown there is no support for the saw frame or frames independent of their pivotal connection with the clamp support *a;* but it will be understood that if the saw frame or frames and the parts connected therewith are large enough and heavy enough in practice to render independent supports necessary such supports may be provided; but in the case of the smaller class of trees no such supports are necessary and are therefore not shown and described.

Although I have shown and described manually-operated gearing for driving the saw-carrying frame *e*, it will be apparent that a small motor of any preferred form may be attached to the main swinging frame *d* for operating said saw-carrying frame without departing from the spirit of my invention or sacrificing its advantages, and many other changes in and modifications of the construction herein described may be made within the scope of my invention as set out in the appended claims.

Having fully described my invention, what I claim as new, and desire to secure by Letters Patent, is;—

1. An apparatus for felling trees, comprising a support adapted to be secured to a tree and provided with a projecting member, a main U-shaped frame pivoted to said member and adapted to swing in a plane parallel with that of the support, a supplemental U-shaped frame mounted on the main frame and movable longitudinally thereof, a saw connected with the ends of the side arms of the supplemental frame, and means for operating said supplemental frame.

2. An apparatus for felling trees, comprising a clamp device adapted to be secured around the body of a tree in a horizontal plane and provided with a projecting member, a main U-shaped frame pivoted to said member and adapted to swing in a horizontal plane parallel therewith, a supplemental U-shaped frame mounted on the main frame and movable longitudinally thereof, a saw connected with the ends of the side arms of the supplemental frame, and means for reciprocating the supplemental frame longitudinally of the main frame.

3. An apparatus for felling trees, comprising a clamp device adapted to be secured around the body of a tree in a horizontal plane and provided with a projecting member, a main U-shaped frame pivoted to said member and adapted to swing in a horizontal plane parallel therewith, a supplemental U-shaped frame mounted on the main frame and movable longitudinally thereof, a saw connected with the ends of the side arms of the supplemental frame, and means for reciprocating the supplemental frame longitudinally of the main frame, said main frame being also provided with a handle by which it may be swung on its pivotal support.

4. In an apparatus for felling trees, the combination with a support adapted to be secured to the body of a tree and in a horizontal position, of a main supporting frame pivoted on said support and adapted to swing parallel therewith and thereover, a saw holding frame mounted on said main frame movable therewith and adapted to be reciprocated thereon, said main frame extending outward and supporting the outer end of said saw frame, and means for reciprocating the saw frame upon the main frame.

5. In an apparatus for felling trees, the combination with a support adapted to be secured to the body of a tree and in a horizontal position, of a main frame pivoted on said support and adapted to swing parallel therewith and above said support, a saw holding frame mounted on said main frame, movable therewith and adapted to be reciprocated thereon, said main frame extending outward and supporting the outer end of said saw frame, and means including a revolving shaft and crank for reciprocating said saw frame.

In testimony that I claim the foregoing as my invention I have signed my name, in presence of the subscribing witnesses, this 9th day of June, 1908.

ETSON L. FREESE.

Witnesses:
A. R. APPLEMAN,
C. E. MULREANY.